(No Model.)
J. M. STONE.
COTTON STALK CUTTER.
No. 274,670. Patented Mar. 27, 1883.
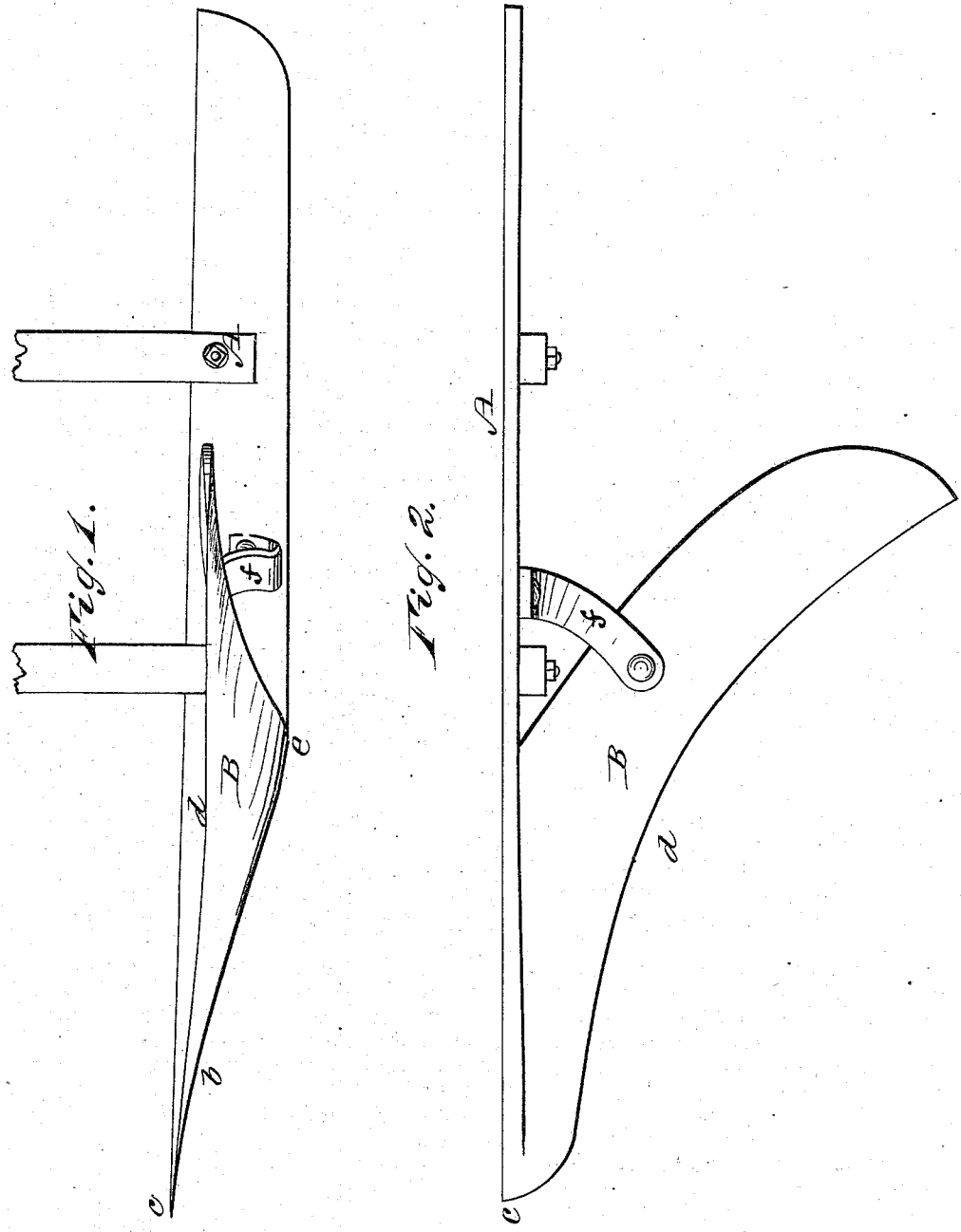
WITNESSES:
INVENTOR:
J. M. Stone
BY
ATTORNEYS.

UNITED STATES PATENT OFFICE.

JAMES M. STONE, OF HOWE, TEXAS.

COTTON-STALK CUTTER.

SPECIFICATION forming part of Letters Patent No. 274,670, dated March 27, 1883.

Application filed January 9, 1883. (No model.)

*To all whom it may concern:*

Be it known that I, JAMES M. STONE, of Howe, in the county of Grayson and State of Texas, have invented a new and useful Improvement in Cotton-Stalk Cutters, of which the following is a full, clear, and exact description.

This invention relates to the shearing device of a cotton-stalk cutter; and it consists in a novel construction of the share or blade, which is made to lie comparatively flat on the ground and to sever the stalk with a hand-shear cut.

Reference is to be had to the accompanying drawings, forming a part of this specification, in which similar letters of reference indicate corresponding parts in both the figures.

Figure 1 represents a side view of my improved share of a cotton-stalk cutter, with its base plate or bar; and Fig. 2 is a plan of the same.

A in the drawings indicates a base plate or bar, which carries the share or blade B, and which is attached in any suitable manner to the frame of the implement or machine. This base plate or bar works edge downward on the ground, and may be straight for the greater portion of its length, only shelving slightly upward in front, as at $b$, to where it joins the point $c$ of the share. The share B, which projects laterally as a wing from the one side of the bar A, starting at its point $c$ and spreading gradually outward in a rearward direction, has its outer or cutting edge, $d$, made of a gentle curve or slope longitudinally, and so that it stands at only a slight elevation above the bottom edge of the bar A, while the under side of the share is made to gradually shelve upward from the forward extremity, $e$, of the straight lower edge portion of the bar A to both ends of the share.

By the within-described construction and arrangement the share B is made to lie comparatively flat on the ground, with its cutting-edge horizontal, or nearly so, and to work with a gradual shear cut, similar to that of a pair of hand-shears, on the cotton-stalks.

A brace, $f$, may be applied to stiffen the connection of the blade with the bar.

I am aware that it is old, broadly, to employ an outwardly-projecting knife or cutter affixed to a bar or runner disposed edgewise to the ground; that it is old to employ an outwardly-curved knife pivoted to a base piece or runner, and that it is old to cause the cutter or share to have a nearly flat or slightly-inclined position, said share having, in connection with a front resting-point, a rear resting-point.

Having thus described my invention, I claim as new and desire to secure by Letters Patent—

In a cotton-stalk cutter, the combination, with a base plate or bar, A, having an approximately straight lower edge for a portion of its length, of the attached share or blade B, arranged to project laterally from said bar and outward in a rearward direction, and constructed on its under side to shelve upward toward both ends from the extremity of the lower straight edge of the bar, and with its cutting-edge $d$ made to present a shear cut in a horizontal plane, or nearly so, substantially as specified.

JAMES MICAJAH STONE.

Witnesses:
J. T. COOKE,
H. P. WILSON.